(12) United States Patent
Henshaw et al.

(10) Patent No.: US 6,189,964 B1
(45) Date of Patent: Feb. 20, 2001

(54) OPERATOR'S STATION FOR A LIFT TRUCK INCLUDING THREE POSITION SEAT ASSEMBLY

(75) Inventors: Robert Joseph Henshaw, Evanston, IL (US); Baron Carl Brandt, Huber Heights; Steve Carlyle Billger, Celina, both of OH (US)

(73) Assignee: Crown Equipment Corporation, New Bremen, OH (US)

( * ) Notice: Under 35 U.S.C. 154(b), the term of this patent shall be extended for 0 days.

(21) Appl. No.: 09/141,085

(22) Filed: Aug. 27, 1998

Related U.S. Application Data (60) Provisional application No. 60/057,375, filed on Aug. 28, 1997, and provisional application No. 60/058,101, filed on Sep. 5, 1997.

(51) Int. Cl.⁷ .................................................. A47C 13/00
(52) U.S. Cl. ........................ 297/112; 297/238; 297/335; 187/222
(58) Field of Search ............................ 297/14, 112, 232, 297/233, 238, 331, 335, DIG. 10; 187/222, 227; 180/326, 329, 330, 331, 273

(56) References Cited

U.S. PATENT DOCUMENTS

| | | |
|---|---|---|
| 4,730,691 | 3/1988 | Grigg . |
| 5,044,472 | 9/1991 | Dammeyer et al. . |
| 5,363,934 * | 11/1994 | Edmund et al. ............... 297/DIG. 10 |
| 5,364,151 * | 11/1994 | Yurasitis ............................ 180/326 X |
| 5,688,025 * | 11/1997 | Davidson ............................... 297/238 |

FOREIGN PATENT DOCUMENTS

| | | |
|---|---|---|
| 195 18 116 A1 | 11/1995 | (DE) . |
| 44 37 568 C1 | 1/1996 | (DE) . |
| 44 34 908 C1 | 3/1996 | (DE) . |
| 2 287 649 | 9/1995 | (GB) . |
| WO 95 01889 | 1/1995 | (WO) . |

* cited by examiner

*Primary Examiner*—Anthony D. Barfield
(74) *Attorney, Agent, or Firm*—King & Schickli, PLLC (57) ABSTRACT

An improved operator's station includes an improved three position seat assembly which allows the operator to stand, perch or sit while maintaining the operator's eyes at essentially the same vertical level. The seat assembly includes a back rest, a seat that may be raised and lowered, and a movable shelf or perch positioned between the back rest and the seat. In a stand mode of operation, the seat is lowered and the shelf is raised; in a perch mode of operation, the shelf is lowered to provide a partial support for the weight of the operator; and, in a sit mode of operation, the seat is raised for substantially full support of the weight of the operator and the shelf is raised to be flush with the back rest. Two sets of foot pedals are provided in the improved operator's station. A first set of pedals is on the floor and includes a brake pedal and a power pedal. These pedals are operated when the operator is either standing or perching. A second set of pedals is raised above the first set of pedals and positioned to be operated when the operator is in the seated position, although the operator may optionally also use one or the other of the raised pedals in either the stand or perch modes of operation, thus providing additional flexibility in operating positions.

11 Claims, 8 Drawing Sheets

OPERATOR'S STATION FOR A LIFT TRUCK INCLUDING THREE POSITION SEAT ASSEMBLY

CROSS REFERENCE TO RELATED APPLICATIONS

This application claims the benefit of U.S. Provisional Patent Applications Ser. No. 60/057,375 filed Aug. 28, 1997 and entitled THREE POSITION SEAT ASSEMBLY FOR LIFT TRUCK; and, Ser. No. 60/058,101 filed Sep. 5, 1997 and entitled THREE POSITION SEAT ASSEMBLY FOR LIFT TRUCK which are incorporated herein by reference for all purposes.

BACKGROUND OF THE INVENTION

The present invention relates in general to materials handling vehicles and, more particularly, to an improved operator's station including a three position seat for use in such vehicles which permits operators of the vehicles to stand, perch or sit while maintaining the eyes of the operators at substantially the same vertical level regardless of the operators' positions. While the present invention is generally applicable to materials handling vehicles, it is described herein with reference to a fork lift truck, specifically a rider reach truck, for which it is particularly applicable and initially being used.

To best ensure efficient operation of a fork lift truck, such as a rider reach truck, during the time encompassed by a normal length operating shift, it is desirable that the operator be comfortable throughout the shift. Operator comfort can depend upon being able to operate the truck in a desired position, such as standing, sitting or perching, depending upon the operator's preference and the application. Also, due to the time extent of a normal operating shift, operators may want to change their operating position since a single operating position may, depending upon an application and use of the truck, become less comfortable over time even when an operator is able to move or shift within that position. Accordingly, provisions have been made to provide alternate operating positions for fork lift trucks. For example, in U.S. Pat. No. 5,275,255, an integrated controls and seating arrangement is disclosed for reach fork vehicles.

In the '255 patent, an operator's station includes a seat which is movable between a lowered position and a raised position. A seated operating position is provided when the seat is lowered and, when the seat is raised, standing and/or leaning positions are provided. In the leaning position, an operator leans against the raised seat. Pivoting control arms are also provided. As described, the arms are pivoted to a down position for the seated and leaning positions and to an upright position for the standing position. While alternate operating positions are thus provided, sitting on or leaning against the top of a folded seat is not an ideal comfortable alternate operating position. Further, it is apparent that the eyes of the operator are located at differing vertical levels depending upon the operating position which is selected by the operator. Such different vertical levels for the operator's eyes produce different perspective views for the operator which may impact operation of the vehicle and the efficiency of the operator.

There is, thus, a need for an improved operator's station for materials handling vehicles to provide a number of alternate operating positions which are comfortable for operators of the vehicles. Preferably, the improved operator's station would include a seat which would not only provide comfortable alternate operating positions but also would maintain the eyes of operators at substantially the same vertical level regardless of the operating position selected by the operator to thereby further improve consistent and efficient operation of the vehicles.

SUMMARY OF THE INVENTION

In the present invention, an improved operator's station for a materials handling vehicle or fork lift truck includes an improved three position seat assembly which allows the operator to stand, perch or sit while maintaining the operator's eyes at essentially the same vertical level regardless of the operator's position. A handle for controlling the ground travel of the truck and movement of the forks of the truck is mounted on an arm rest that extends from the seat assembly. The seat assembly is vertically adjustable in order to place the seat at a vertical height that will ensure an appropriate and consistent eye level for each operator of the truck. The seat assembly includes a back rest, a seat that may be raised and lowered, and a movable, integral shelf or perch positioned between the back rest and the seat, which self or perch can be pivoted between a retracted position and an extended position.

In a stand mode of operation, the seat is lowered and the shelf is retracted or raised, thus presenting to the operator a relatively smooth back rest support for cradling the back side of the operator and providing a fifth point of operator stability in addition to the hand and feet controls. In a perch mode of operation, the shelf is extended or lowered to provide a perch for partial support of the weight of the operator. In a sit mode of operation, the seat is raised for substantially full support of the weight of the operator and the shelf is raised to be flush with the back rest to present a smooth back support.

Two sets of foot pedals are provided in the improved operator's station. A first set of pedals is on the floor and includes a brake pedal and a power pedal which indicates the operator's presence in the operator's station to connect power for operation of the truck. These pedals are operated when the operator is either standing or perching. A second set of pedals is raised above the first set of pedals and positioned to be operated when the operator is in the seated position, although the operator may optionally also use one or the other of the raised pedals in either the stand or perch modes of operation, thus providing additional flexibility in operating positions.

It is, thus, an object of the present invention to provide an improved operator's station for materials handling vehicles which operator's station provides a number of alternate operating positions which are comfortable for operators of the vehicles; to provide an improved operator's station for materials handling vehicles which includes an improved three position seat assembly having a back rest, a seat and a shelf; to provide an improved operator's station for materials handling vehicles which allows an operator to stand, perch or sit while maintaining the operator's eyes at essentially the same vertical level; and, to provide an improved operator's station for materials handling vehicles having two sets of foot pedals to enable an operator to change position from time to time for variety and comfort.

Other objects and advantages of the invention will be apparent from the following description, the accompanying drawings and the appended claims.

DETAILED DESCRIPTION OF THE INVENTION

Figure 1:
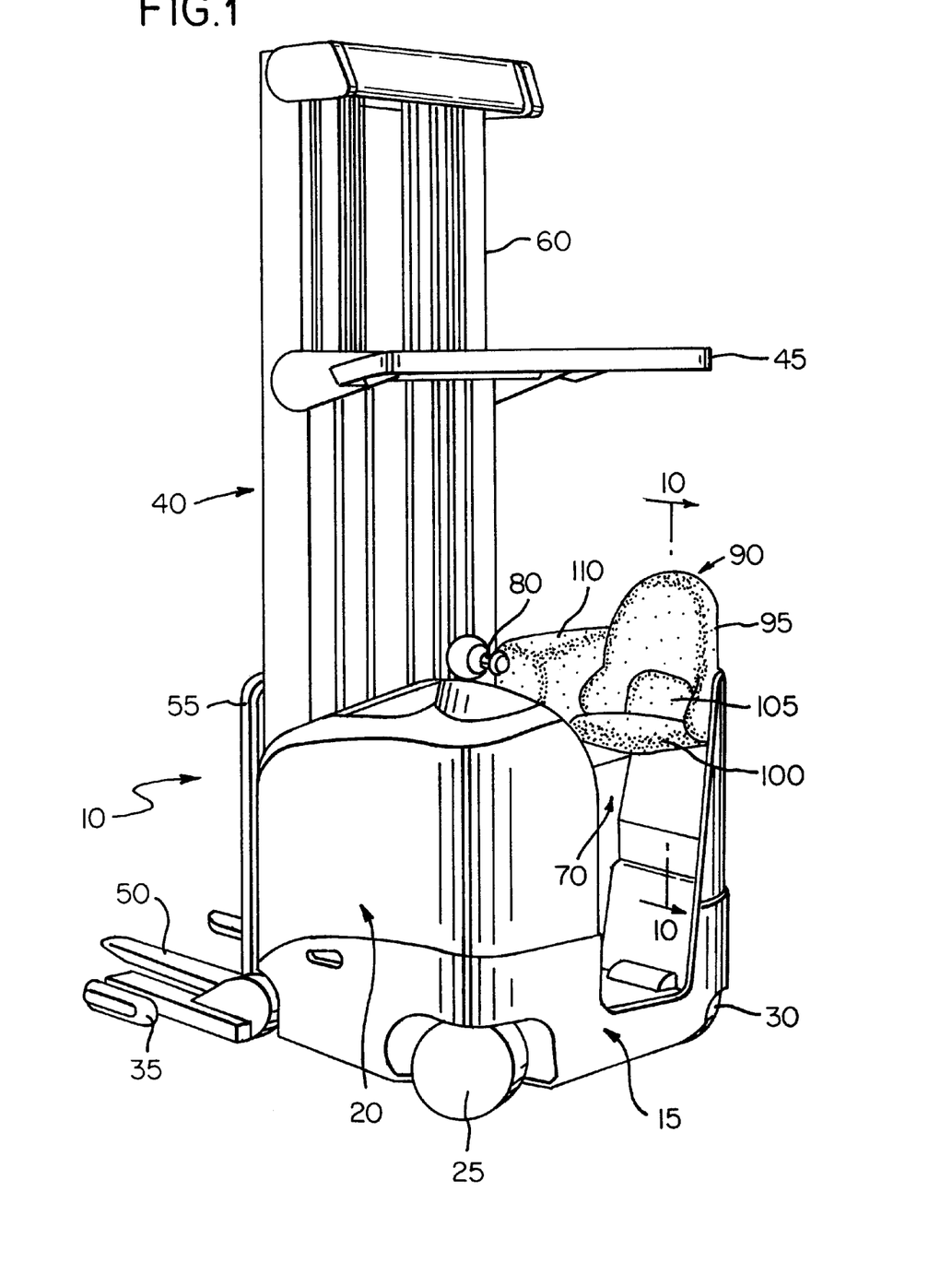
FIG. 1 is a perspective view showing a rider reach truck incorporating the improved operator's station and seat assembly of the present invention.

FIG. 1 shows a rider reach truck 10 that includes a power unit 15 which houses a battery in the area indicated generally by the numeral 20 for supplying power to a traction motor (not shown) connected to a steerable wheel 25 located at the left rear corner of the power unit 15 and to hydraulic motors (not shown) which supply power to several different systems within the truck 10. A caster wheel 30 is mounted at the right rear corner of the power unit 15. A pair of outriggers 35 support the front end of the truck 10.

A mast assembly 40 mounted to the front of the truck 10 includes an overhead guard 45. A pair of forks 50 are carried on a fork carriage mechanism 55 which is carried on extendable mast elements 60. The fork carriage mechanism 55 may include a reach mechanism to allow the forks 50 to be extended forward of the mast assembly 40, a side shift mechanism to permit the forks 50 to be moved from side to side relative to the mast assembly 40, and a tilt mechanism to permit the forks 50 to be tilted relative to horizontal.

Figure 2:
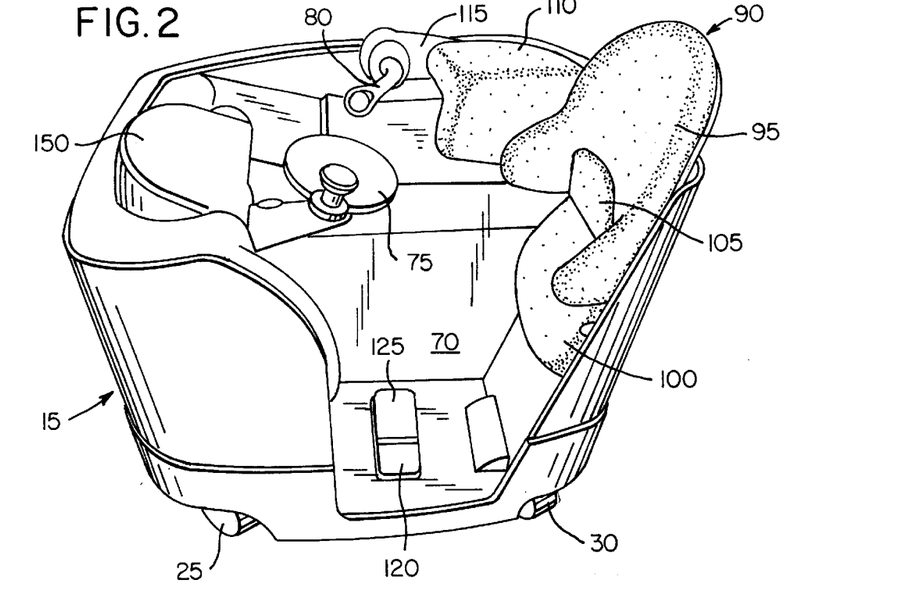
FIG. 2 is a perspective view of the power unit of the rider reach truck of FIG. 1 showing the various components included in the operator's compartment.
Figure 3:
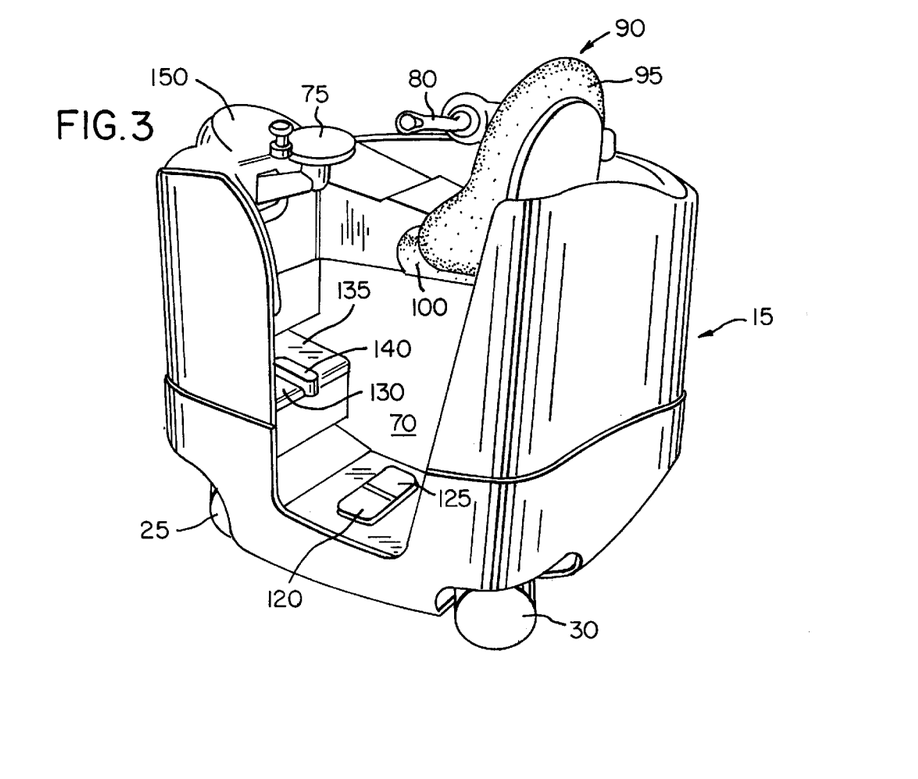
FIG. 3 is another perspective view of the operator's compartment of FIG. 2 showing elevated foot pedals.

The power unit 15 also includes an operator's compartment 70, also see FIGS. 2 and 3, which defines an operator's station and in which is mounted a steering tiller 75 for controlling the direction of travel of the truck 10 and a control handle 80 for controlling the speed of travel and the forward and reverse direction of the truck 10 as well as fork height, fork extension, and fork tilt and side-shift.

Also mounted within the operator's compartment 70 is a seat assembly 90 which is attached to the right side of the power unit 15, as shown in FIGS. 1–3. The seat assembly 90 includes a back rest 95, a seat 100, and a shelf 105 (or perch). The seat assembly 90 is vertically adjustable to accommodate operators having a range of heights. An armrest 110 is supported on the seat assembly 90 for movement therewith. The control handle 80 is mounted on an arm 115 extending from the armrest 110.

On the floor of the operator's compartment 70 are two pedals 120, 125. The left-hand pedal 120 operates an electric switch to control braking of the truck 10 and the right-hand pedal 125 operates an electric switch, the operation of which is required to operate the truck. Also located within the operator's compartment are three additional pedals: a pedal 130, corresponding to the pedal 120; a pedal 135, corresponding to the pedal 125; and a pedal 140, which is an additional brake control pedal. The operator must have one foot on and depress either the pedal 120 or the pedal 130 in order for the vehicle to move; otherwise, the truck's brakes will be fully applied. The operator must also depress either the pedal 125 or the pedal 135 in order for the vehicle to move. If the operator removes a foot from the pedal 125 or the pedal 135 while the truck is moving, the truck will coast.

The switches controlled by pedals 125 and 135 are known as power switches and indicate the presence of an operator within the operator's compartment 70. The pedal 140 operates an auxiliary brake switch so that anytime the operator depresses the pedal 140, the brakes of the truck will be immediately applied. To distinguish the brake control pedals 120, 130 from the brake control pedal 140, the pedals 120, 130 will be referred to herein as "release to brake" pedals in accordance with their operation and the pedal 140 will be referred to herein as the "depress to brake" pedal.

An operator's console 150 provides an operator of the truck 10 with information regarding the status of the battery voltage and may provide additional information regarding the fork height, the weight of the load on the forks, and other information to assist the operator of the truck 10.

Figure 4:
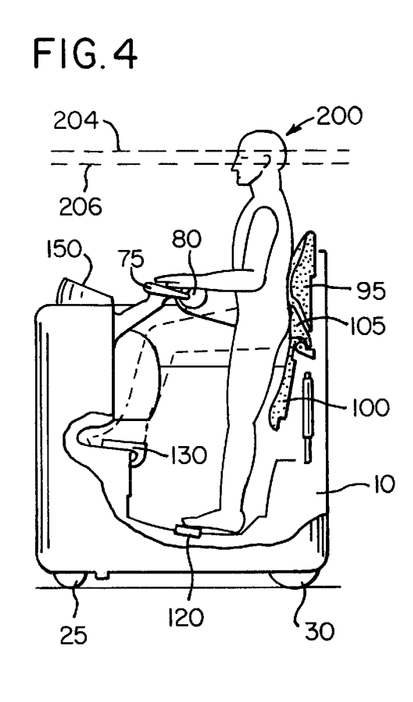
FIG. 4 is a cut away elevational end view showing the seat in its lowered position and the operator in a standing position.
Figure 5:
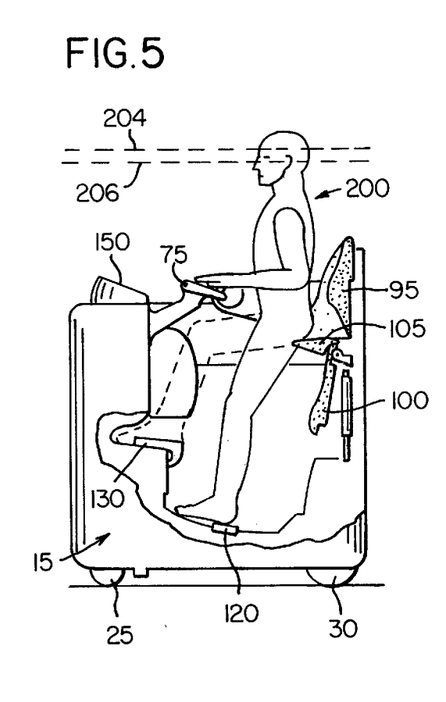
FIG. 5 is a cut away elevational end view showing a shelf of the seat lowered and the operator in a perching position.
Figure 6:
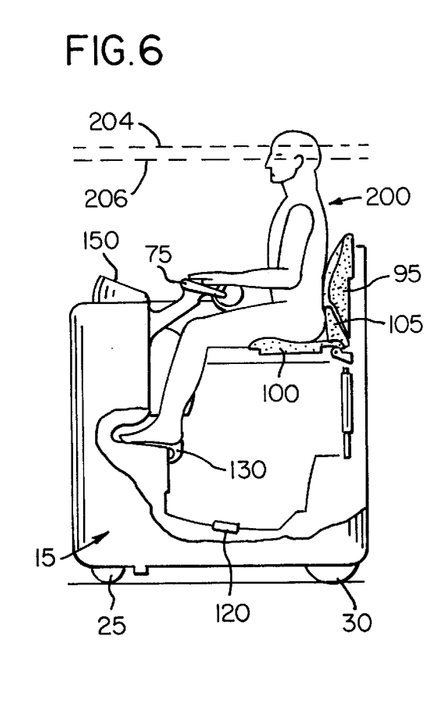
FIG. 6 is a cut away elevational end view showing the seat and shelf raised and the operator in a seated or sitting position.

FIGS. 4, 5, and 6 illustrate the various positions an operator can assume during operation of the truck 10. FIG. 4 illustrates the operator standing position or the stand mode of operation, FIG. 5 illustrates the operator perching position or the perch mode of operation and FIG. 6 illustrates the operator seated or sit mode of operation.

In the stand mode of FIG. 4, an operator 200 is shown standing, the seat 100 is lowered to be generally aligned with the back rest 95 and the shelf 105 is raised to be generally aligned with the back rest 95 such that the seat assembly 90 forms an operator cradling surface. In this operating mode, the operator 200 is essentially presented with a contoured, cradling surface to support the back side of the operator's body providing a fifth point of operator stability for the operator in addition to the hand and feet controls. The operator's feet are generally placed on the floor pedals 120 and 125, as shown, to enable operation of the truck 10.

In the perch mode of FIG. 5, the shelf 105 is extended or lowered to the position shown so that the shelf 105 is angularly oriented relative to the back rest 95 rather than being aligned with the back rest 95 as in FIGS. 4 and 6. This allows the operator 200 to perch upon the lowered shelf 105 by resting his/her buttocks on or against the shelf 105 partially to support the weight of the body. In the perch mode of operation, the feet are normally moved slightly forward so that the operator's heels are usually placed on the floor mounted pedals 120 and 125.

In the sit mode of FIG. 6, the seat 100 is placed in the raised position such that it is angularly oriented (generally perpendicular as illustrated) relative to the back rest 95, the shelf 105 is raised until it is flush with the back rest 95, and the operator's feet are resting on the pedals 130 and 135.

The seat assembly 90 is adjustable vertically in order to place the seat assembly 90 at the vertical height that will ensure an appropriate and consistent eye level relative to the truck and the floor for each operator of the truck whether the operator is standing, perching or sitting The dashed horizontal lines 204 and 206 in FIGS. 4–6 show the limited extent of vertical movement of the operator's eyes, provided the seat assembly 90 is properly adjusted.

If desired, the operator 200 shown in FIGS. 4 and 5 may rest one foot on one of the floor mounted pedals 120 and 125, and the other foot on one of the elevated pedals 130, 135, and thus operate the truck 10 while changing position from time to time for variety and comfort.

Figure 7:
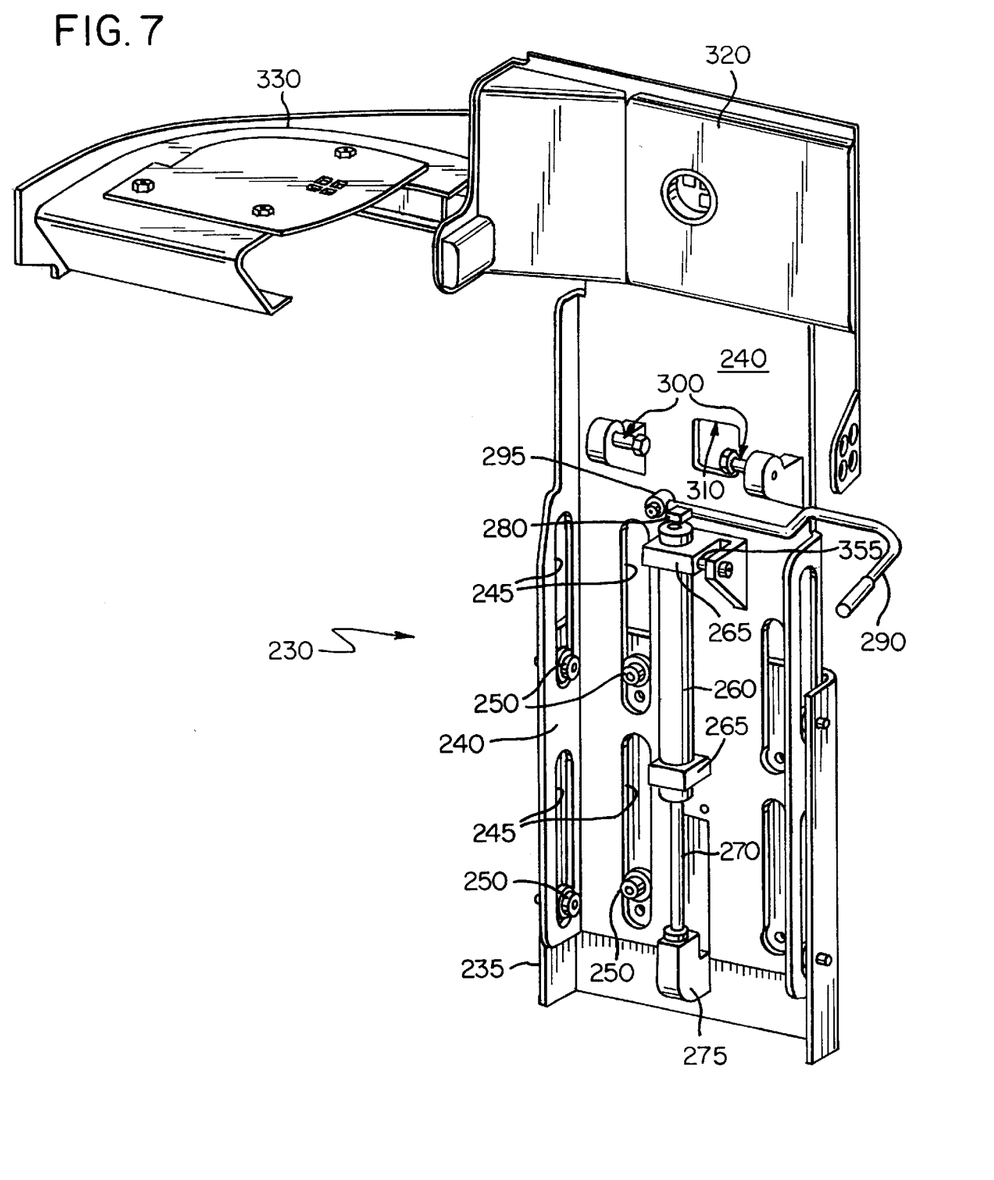
FIG. 7 is a perspective view of a seat assembly frame in its uppermost vertical position relative to a mounting bracket.
Figure 8:
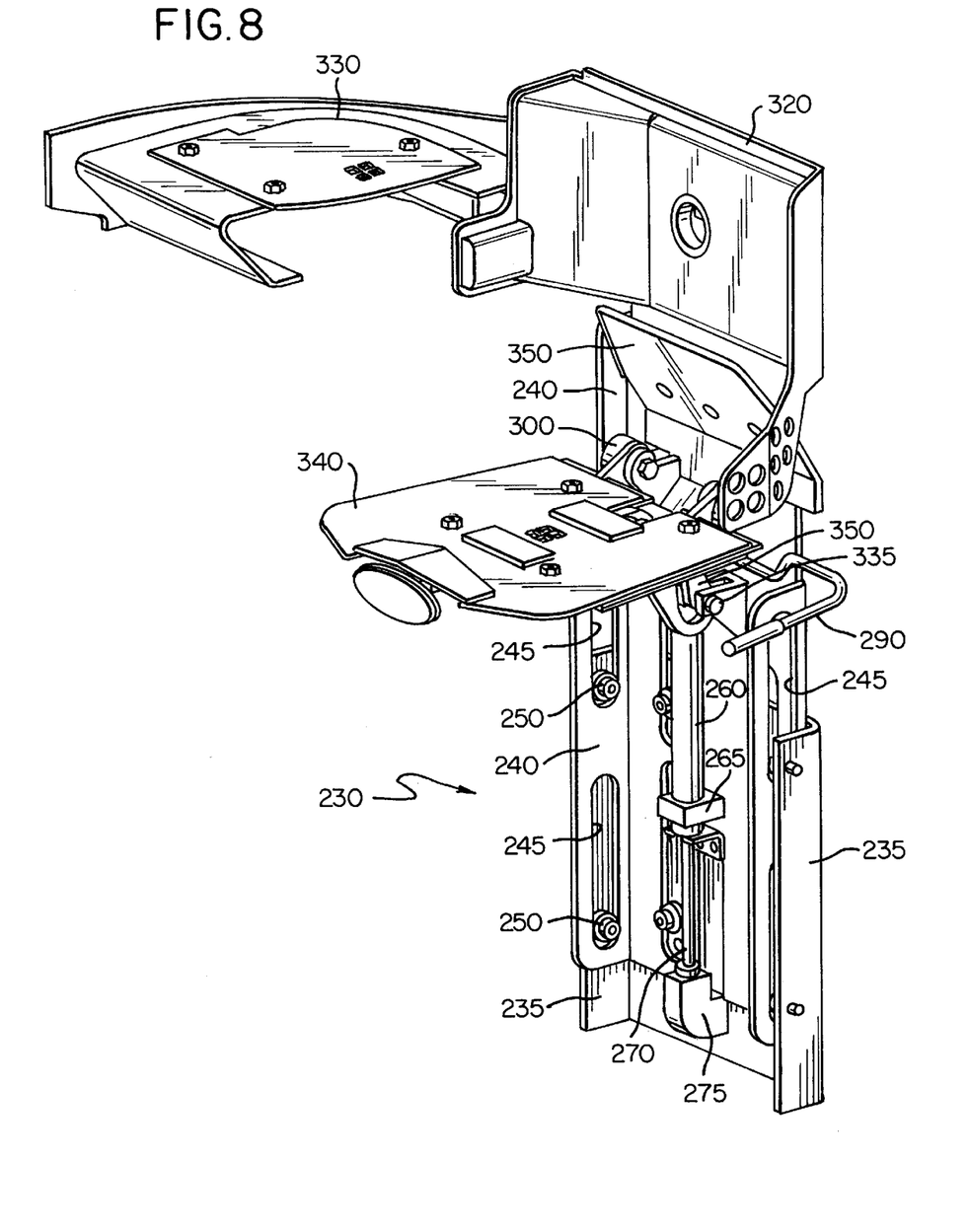
FIG. 8 is a perspective view similar to FIG. 7 showing the seat assembly in its uppermost vertical position and including a seat pan and a shelf pad insert.

The seat assembly 90 is mounted for limited vertical movement using the mechanism 230 shown in FIGS. 7 and 8. Referring primarily to FIG. 7, a U-shaped member 235 is fixedly attached to the power unit 15 inside the operator's compartment 70. A movable member 240 nests within the bracket 235 and is provided with a set of vertically extending slots 245 which cooperate with a set of roller bearings 250 mounted on the member 235 to permit free vertical movement of the movable member 240 while preventing the member 240 from moving horizontally.

A gas cylinder 260 is mounted on the member 240 by brackets 265 with a plunger 270 extending to a bracket 275 attached to the member 235. A valve 280 at the top of the cylinder 260 is controlled by an arm 290 pivotally attached to the member 240 at 295. Depressing the arm 290 allows the operator of the truck 10 to properly position the seat assembly 90 vertically for that operator. Once the arm 290 is released, the valve 280 closes and the seat assembly 90 remains in its selected vertical position.

A pair of pivot points, or hinge members 300 are mounted at the upper portion of the member 240. These hinge members 300 support both the seat 100 and the shelf 105. An opening 310 is formed in the member 240. An extension 312 engages the opening 310 to act as a stop for the shelf 105 as shown in FIG. 101.

Extending above and attached to the member 240 is a support member 320 for the back rest 95, and extending from the support member 320 is a support structure 330 for the arm rest 110. As shown in FIG. 8, a seat pan 340 is pivotally attached to the hinge members 300, as is a perch insert 350.

Figure 9:
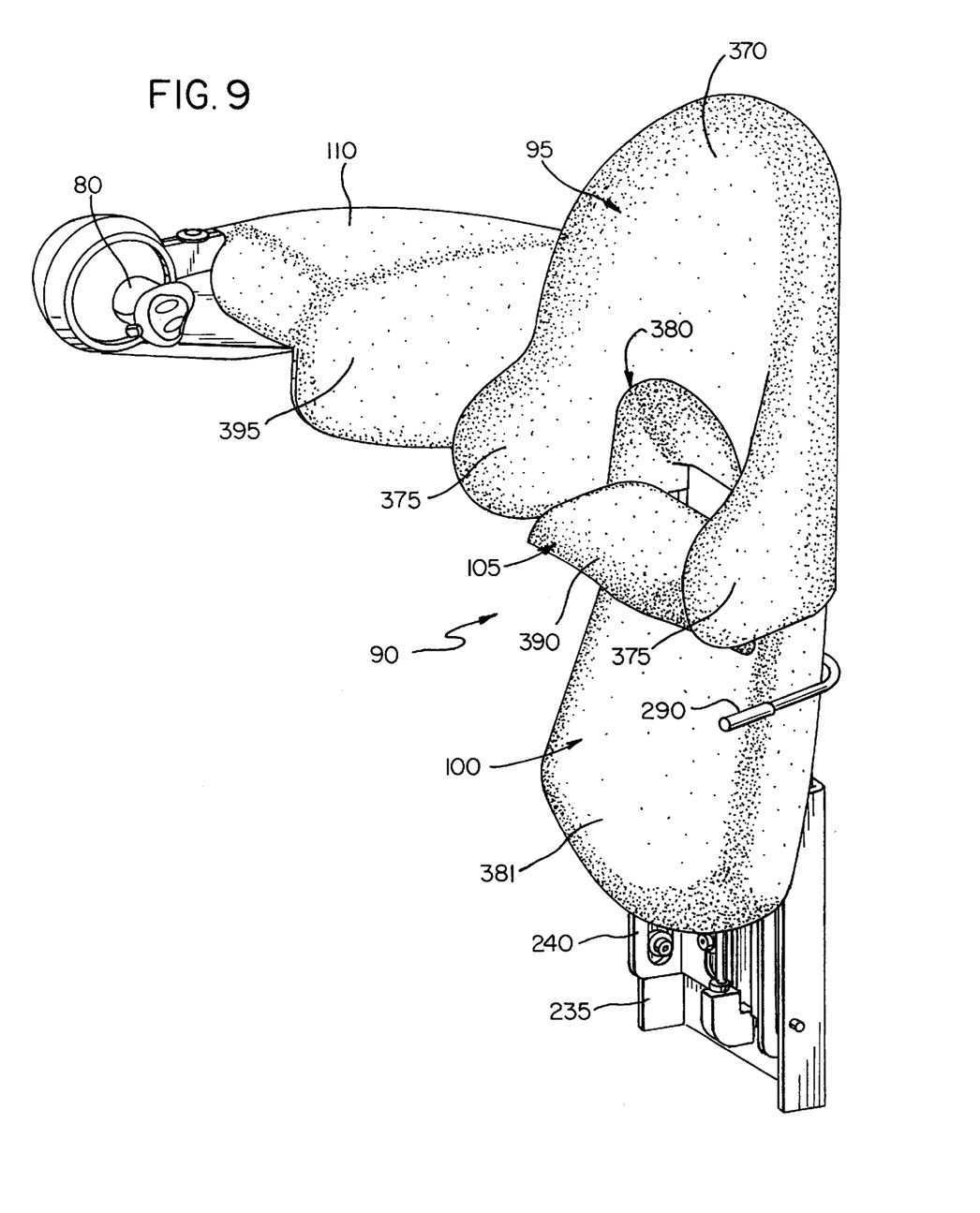
FIG. 9 is a perspective view of the seat assembly showing the shelf pad extended and the seat lowered for the perch mode of operation illustrated in FIG. 5.
Figure 10:
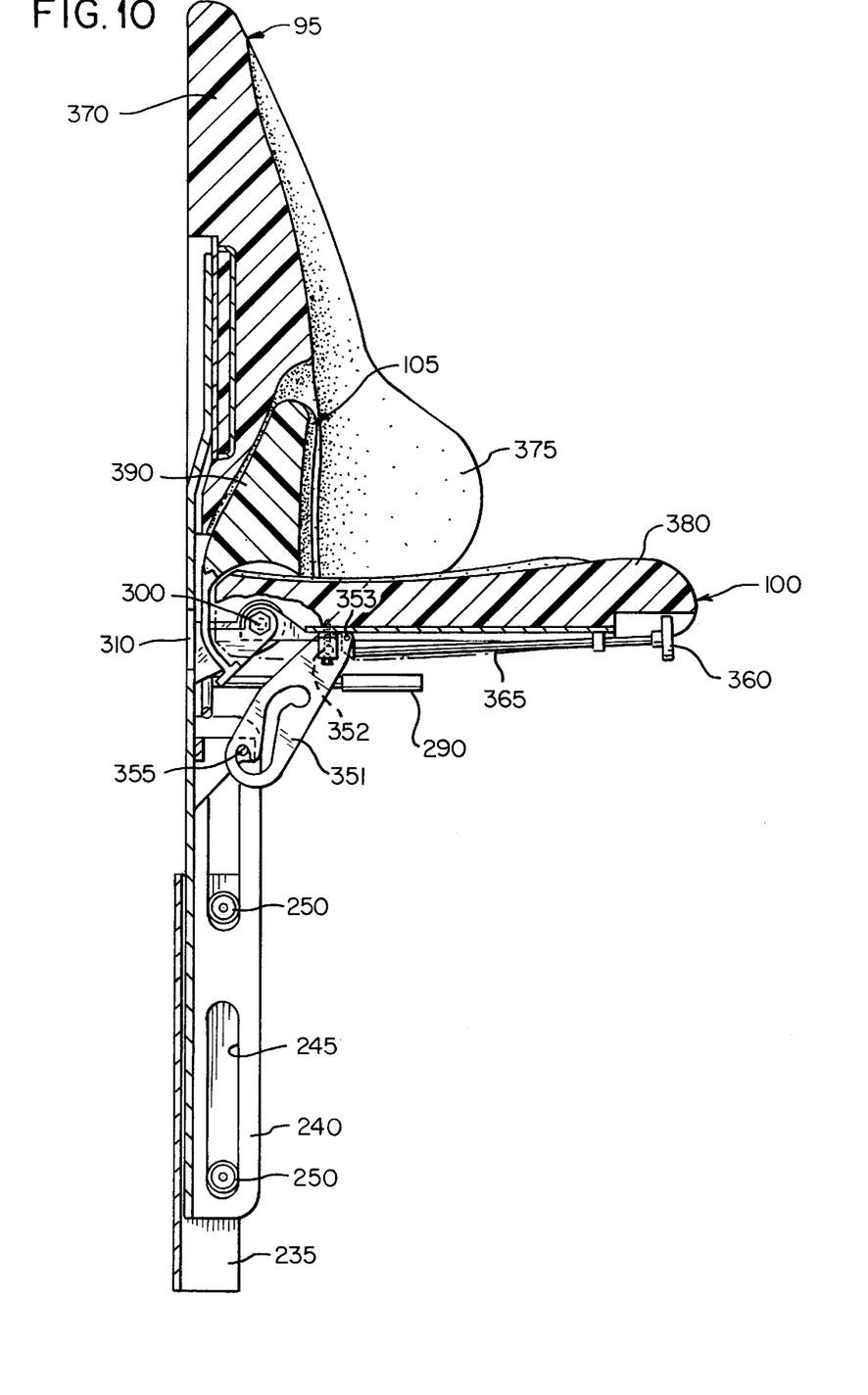
FIG. 10 is a sectional view taken along a plane including the section line 10—10 of FIG. 1 with the seat and shelf raised.
Figure 11:
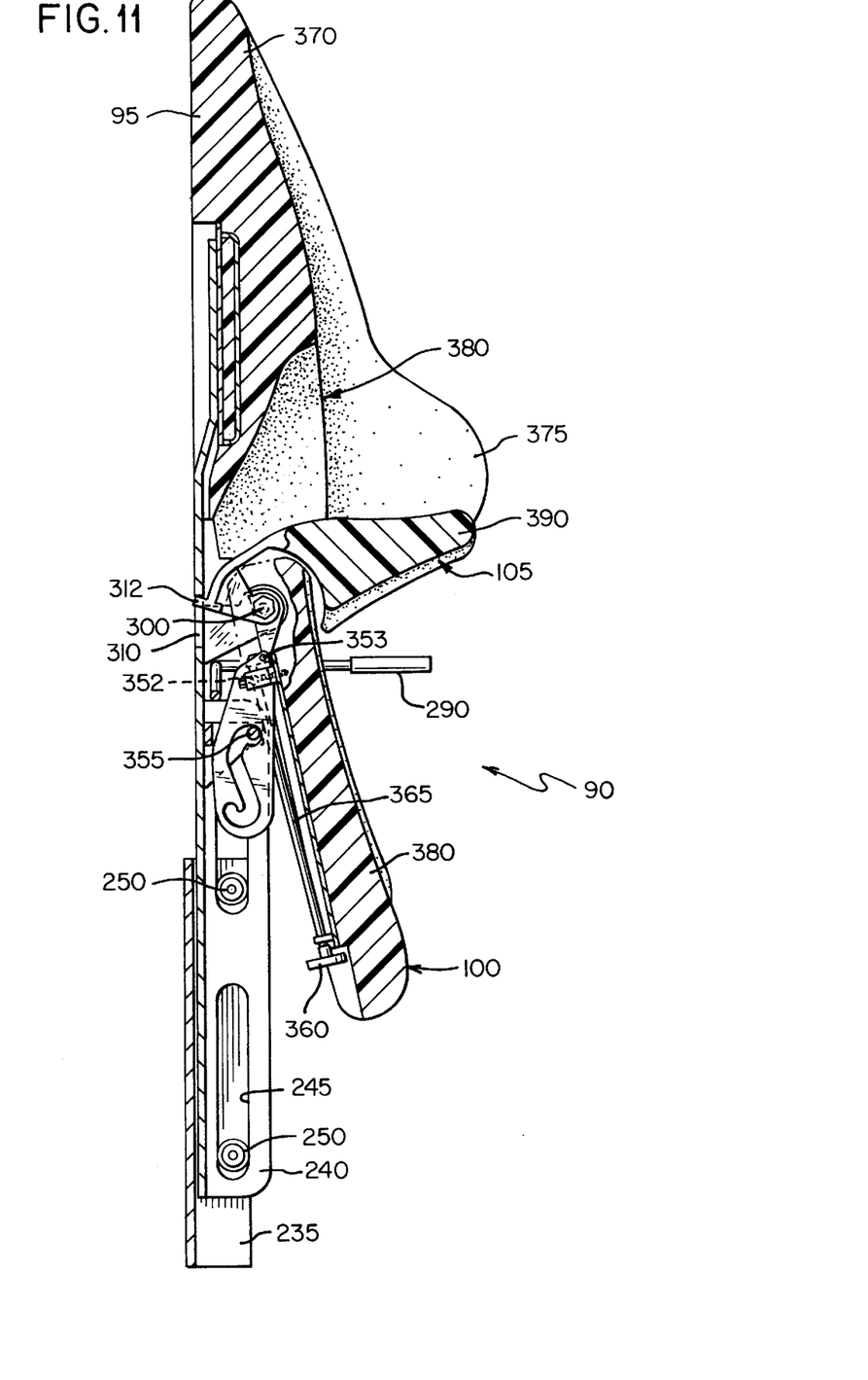
FIG. 11 is a sectional view taken along a plane including the section line 10—10 of FIG. 1 with the seat and shelf lowered.

Referring to FIGS. 10 and 11, the seat 100 is supported in its raised position shown in FIG. 10 by a centrally located seat cam latch 351 which is provided with an S-shaped slot that cooperates with a pin 355 and is mounted for pivotal movement about a pivot point 352. A seat cam latch release lever 360 moves a rod 365 that is pivotally attached to the latch 351 at 353 to release the seat 100, which may then be lowered to the position shown in FIG. 11. To lower the seat 100, the seat 100 is raised and the release lever 360 is pulled such that the S-shaped slot in the cam latch 351 becomes disengaged from the pin 355 at which time the seat 100 can be lowered. The shelf 105 may be moved by the operator between its retracted or raised position shown in FIGS. 1, 2, 4, 6 and 10 to its extended or lowered position shown in FIGS. 5, 9 and 11.

The back rest 95 includes a foam back pad 370 attached to member 320. The back pad is provided with a pair of wings 375 and includes a recess 380 to accommodate the shelf 105. The seat 100 similarly includes a foam pad 381 that surrounds the seat pan 340. The shelf 105 includes a foam pad 390 that surrounds the perch insert 350. The arm rest 110 also includes a foam pad 395 covering the support structure 330. It is noted that raising the seat 100 will cause the shelf 105 automatically to be raised and made substantially flush with the back rest 95.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. An operator's station for a materials handling vehicle comprising:
    a seat assembly comprising:
        a back rest;
        a seat movable between a raised position adjacent to and angularly oriented relative to said back rest for seated operation of said vehicle and a lowered position for standing and perching operation of said vehicle, said back rest and said seat, when in said lowered position, forming an operator cradling surface; and
        a shelf positioned between said back rest and said seat, said shelf being movable between a raised position substantially aligned with said back rest for seated and standing operation of said vehicle and a lowered position angularly oriented relative to said back rest for perching operation of said vehicle.

2. An operator's station as claimed in claim 1 wherein said shelf defines a portion of said back rest when said shelf is in said raised position.

3. An operator's station as claimed in claim 1 wherein said operator's station includes a floor and further comprises:
    a first set of pedals on said floor; and
    a second set of pedals raised above said floor and positioned to be operated from said sitting position.

4. An operator's station as claimed in claim 3 wherein said first set of pedals and said second set of pedals are both operable so that an operator in said operator's station can operate one of said second set of pedals to provide flexibility of operating positions.

5. An operator's station as claimed in claim 3 wherein said first set of pedals comprises a release to brake pedal and a power pedal.

6. An operator's station as claimed in claim 3 wherein said second set of pedals comprises a release to brake pedal and a power pedal.

7. An operator's station as claimed in claim 6 wherein said second set of pedals further comprises a depress to brake pedal.

8. An operator's station for a materials handling vehicle, said operator's station including a floor and comprising:
    a first set of pedals on said floor; and
    a second set of pedals raised above said floor wherein said first set of pedals and said second set of pedals are both simultaneously operable so that an operator in said operator's station can operate one of said first set of pedals and one of said second set of pedals to provide flexibility of operating positions.

9. An operator's station as claimed in claim 8 wherein said first set of pedals comprises a release to brake pedal and a power pedal.

10. An operator's station as claimed in claim 8 wherein said second set of pedal comprises a release to brake pedal and a power pedal.

11. An operator's station as claimed in claim 10 wherein said second set of pedals further comprises a depress to brake pedal.

* * * * *

UNITED STATES PATENT AND TRADEMARK OFFICE
CERTIFICATE OF CORRECTION

PATENT NO. : 6,189,964 B1
DATED : February 20, 2001
INVENTOR(S) : Henshaw et al.

It is certified that error appears in the above-identified patent and that said Letters Patent is hereby corrected as shown below:

<u>Column 6,</u>
Line 36, "operate one of said second set of pedals to provide" should read -- operate one of said first set of pedals and one of said second set of pedals to provide --.

Signed and Sealed this

Twenty-fifth Day of October, 2005

JON W. DUDAS
*Director of the United States Patent and Trademark Office*